United States Patent [19]
Wildey et al.

[11] Patent Number: 5,813,308
[45] Date of Patent: *Sep. 29, 1998

[54] SAW TOOTH ATTACK FACE AND EDGE STRUCTURE

[75] Inventors: Allan J. Wildey, Paris; Benjamin DiSabatino, Brantford, both of Canada

[73] Assignee: Timberjack Inc., Woodstock, Canada

[ * ] Notice: The term of this patent shall not extend beyond the expiration date of Pat. No. 5,579,674.

[21] Appl. No.: 710,898

[22] Filed: Sep. 24, 1996

Related U.S. Application Data

[63] Continuation-in-part of Ser. No. 415,109, Mar. 31, 1995, Pat. No. 5,647,263, which is a continuation-in-part of Ser. No. 219,149, Mar. 29, 1994, Pat. No. 5,579,674.

[51] Int. Cl.$^6$ ........................................ B27B 33/08
[52] U.S. Cl. .................................. 83/835; 83/853; 83/854
[58] Field of Search ............................ 83/835, 836, 838, 83/839, 840, 841, 842, 843, 853, 854, 855; 144/241; 407/42, 116, 114, 115

[56] References Cited

U.S. PATENT DOCUMENTS

| | | | |
|---|---|---|---|
| 1,037,146 | 8/1912 | Hunter | 83/836 |
| 3,800,379 | 4/1974 | Hopkins | 407/116 X |
| 3,818,561 | 6/1974 | Montana et al. | 83/836 X |
| 3,947,937 | 4/1976 | Hertel | 407/116 X |
| 4,116,576 | 9/1978 | Gawryk, Sr. | 407/115 X |
| 4,318,645 | 3/1982 | McCreery | 407/116 X |
| 4,932,447 | 6/1990 | Morin | 144/34 R |
| 5,067,858 | 11/1991 | Cook | 407/116 X |
| 5,088,371 | 2/1992 | MacLennan | 83/840 X |
| 5,116,167 | 5/1992 | Niebauer | 407/116 X |
| 5,131,305 | 7/1992 | MacLennan | 83/840 |
| 5,192,171 | 3/1993 | Ther et al. | 407/116 X |
| 5,199,827 | 4/1993 | Pantzar | 407/116 X |
| 5,203,649 | 4/1993 | Katbi et al. | 407/116 X |
| 5,205,199 | 4/1993 | MacLennan | 83/839 |
| 5,207,538 | 5/1993 | Satran | 407/116 X |
| 5,207,748 | 5/1993 | Katbi et al. | 407/116 X |
| 5,246,315 | 9/1993 | Hannson et al. | 407/116 X |
| 5,261,306 | 11/1993 | Morey et al. | 83/855 X |
| 5,579,674 | 12/1996 | Wildey | 83/835 |
| 5,647,263 | 7/1997 | Wildey | 83/835 |

OTHER PUBLICATIONS

Applicant's Exhibit 1—a Polaroid of saw tooth (undated).
Applicant's Exhibit 2—a Polaroid of saw tooth (undated).
Drawing containing Figs. P1–P5 of saw tooth, admitted prior art, (undated).

*Primary Examiner*—Rinaldi I. Rada
*Assistant Examiner*—Boyer Ashley
*Attorney, Agent, or Firm*—Quarles & Brady

[57] ABSTRACT

A square saw tooth having four cutting edges of the type which is rotatable about its axis on a saw disc to present a fresh cutting edge when the radially outermost edge wears out has carbide wear plates covering the high wear areas of its attack face and providing its cutting edges. A wear plate is provided at each corner of the attack face, and each wear plate has a flat rear surface for attachment to the tooth body and a front surface of a complex shape, having plateau surface areas at the corners, where the plates are thicker, and one or more cylindrically curved concave surfaces which recede from the plateau areas toward the interior of the attack face, so that the plate recedes in thickness away from the plateau area. This construction helps provide more uniform wear over the surfaces and edges of the attack face for a more efficient consumption of the wear plates.

9 Claims, 2 Drawing Sheets

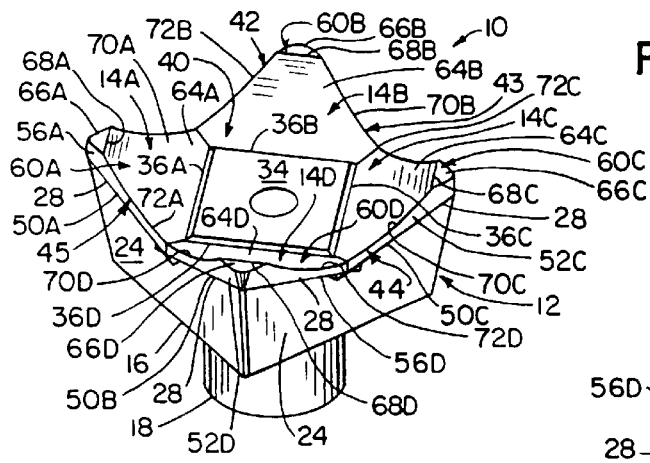

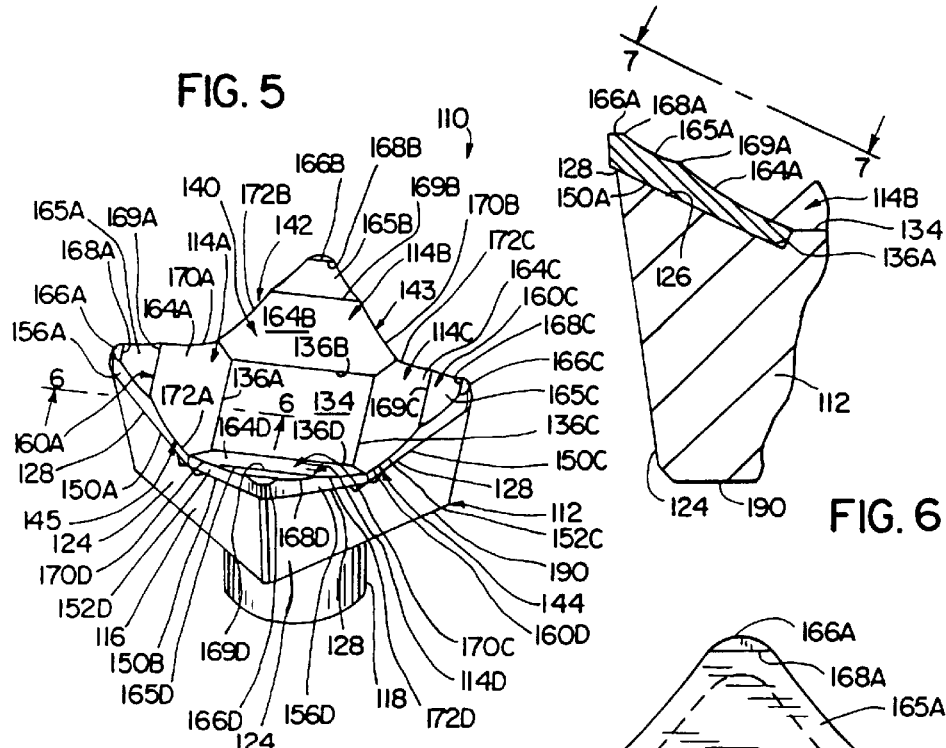
FIG. 5
FIG. 6
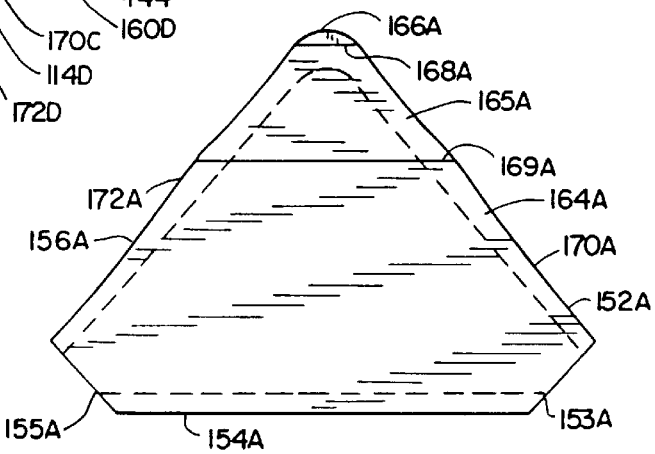
FIG. 7
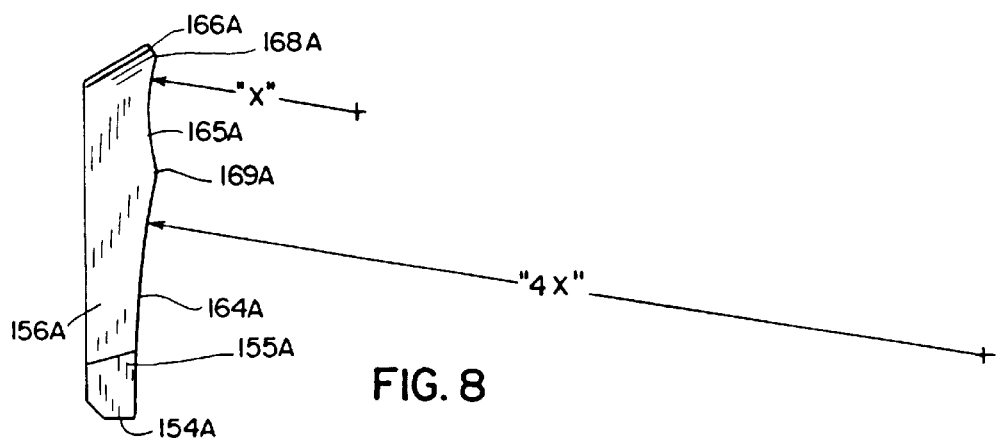
FIG. 8

SAW TOOTH ATTACK FACE AND EDGE STRUCTURE

This is a continuation-in-part of U.S. patent application Ser. No. 08/415,109 filed Mar. 31, 1995, now U.S. Pat. No. 5,647,263, which is a continuation-in-part of U.S. patent application Ser. No. 08/219,149 filed Mar. 29, 1994, now U.S. Pat. No. 5,579,674.

BACKGROUND OF THE INVENTION

1. Field of the Invention

This invention relates to the shape and configuration of the attack face and cutting edge structures of a saw tooth, and particularly to such structures applied to a four-sided rotatable saw tooth for a wood cutting saw.

2. Discussion of the Prior Art

Four-sided rotatable teeth for circular tree cutting saw blades in which one edge of the tooth is positioned radially outermost from the rotary axis of the blade to cut a kerf in a standing tree are known from U.S. Pat. No. 4,932,447. This type of tooth has a four-sided head with an attack face at one end, each side being coterminous with the attack face along a cutting edge. The tooth is oriented on the blade with one of the sides on the outside of the blade so that the one side and its cutting edge are substantially vertical in the cutting position of the blade, as the blade is advanced through a tree. The outside cutting edge forms the kerf by chiseling off the working (vertical) surface of the kerf, and chips from the cutting operation flow along the attack face of the tooth for evacuation from the kerf. When the outside edge becomes dull, the tooth is rotated 90° or 180° about its longitudinal axis and resecured to present one of its other three edges in the outermost position for cutting. When all four edges have become dull, the tooth is replaced or reconditioned.

In this orientation of the tooth on the blade, two of the sides of the tooth are in a substantially horizontal plane, one of the horizontal sides being on the top side of the tooth and the other horizontal side being on the bottom side of the tooth. The top side of the tooth is in close proximity or contact with the top side of the kerf (on the tree trunk) and the bottom side of the tooth is in close proximity or contact with the lower side of the kerf (on the top of the stump). This close proximity or contact results in a certain amount of wear along the top side edge and bottom side edge of the tooth during a cutting operation, although most wear occurs at the outermost side of the tooth which actually cuts the kerf.

Adjacent sides and the attack face of saw teeth meet at the corner tips of the attack face. Because the mass of material of the tooth diminishes toward a corner tip and because abrasion occurs along both of the cutting edges which define a corner tip between the outermost edge and the top and bottom edges, wear is most concentrated at the corner tips of the tooth. Wear of the corner tips is especially exacerbated under sandy conditions of cutting, as occurs frequently in the southeastern part of the United States where sand on the forest floor can get into the bark of the trees, e.g. from wind or rain, and abrade teeth severely or where trees are severed at ground level. In addition, because the corner tips are at the extremities of the leading or attack face of the tooth, they are especially susceptible to damage from impact, for example, from hitting a rock or another piece of equipment.

It has been known to retard wear in all types of saw teeth under these conditions by providing one or more tungsten carbide (or other wear-resistant material, e.g., STELLITE™) plates to cover the high wear areas of the attack face. However, this is only a partial solution to the problem, as the corners still wear more quickly than the inner edges of the attack face, even when the corners and the inner edges are carbide. In addition, the wear plates in prior teeth have typically had sharp points or tips, which wore or broke off relatively easily.

SUMMARY OF THE INVENTION

The invention provides a saw tooth of the type having multiple lateral sides and an attack face at one end. The intersection of the attack face with each side forms a cutting edge along the edge of the side and the intersections of the attack face with each pair of adjacent sides forms a corner. The attack face has four quadrants defined by imaginary mutually orthogonal planes which include an axis of the tooth and bisect the cutting edges, each quadrant being the same as the other quadrants, and each quadrant including a corner. The improvement of the invention is that a plateau with a flat surface is formed at each corner, and each quadrant includes a first concave surface adjacent to the plateau which is defined by a section of a first cylinder of constant radius and having an axis which is perpendicular to a plane which includes the axis of the tooth and extends through the plateau. The plateau and the first concave surface are coterminous along a first adjoining edge which adjoins the plateau and the first concave surface and extends between adjacent cutting edges of the tooth. This results in more tooth material adjacent to the corner tip, where abrasion and the possibility of impact damage is especially high, to result in more even wear over the length of each cutting edge and over the associated areas of the attack face.

In a preferred aspect, the plateaus are coplanar, in a plane which is orthogonal to the longitudinal axis of the tooth. This maximizes the volume of tooth material adjacent to the corner tip. It also provides the possibility of sharpening the cutting edges of the tips by grinding down the plateaus simultaneously on a surface grinder.

In another useful aspect, the receding edges and portions of the attack face are curved to provide efficient chip flow across them and evacuation of chips from the kerf.

In a form which is especially useful for highly abrasive cutting conditions, the tooth comprises a body and wear plates secured to the body, surfaces of the wear plates defining the attack face and edges of the plates defining the cutting edges. The wear plates are thickest at the plateaus so as to provide more even wear across the entire plate, for the most efficient use and consumption of the plates. Preferably, the rear surface of the plates is flat, so that the rear surface can be formed easily and so that the mating surfaces of the body can be easily machined to match the rear surface of the plates.

In another useful aspect, a surface of the attack face which is coterminous with a plateau is defined by a surface of a cylinder, the axis of the cylinder being perpendicular to a plane which includes the axis of the tooth and runs through the plateau. A surface so formed provides both of its adjacent cutting edges with a curvature and provides the adjoining surfaces with a curvature that channels chips out of the kerf, while still allowing making all of the wear plates identical and without complex molding, sintering or machining operations.

In this aspect, where tooth life is more important than quality of severance, a tooth of the invention may be provided having a single cylindrical surface in each quadrant, which is coterminous with a relatively large plateau. Where a better quality of severance is more important, two or more cylindrical surfaces may be provided leading up to the plateau in each quadrant.

Other objects and advantages of the invention will be apparent from the detailed description and the drawings.

BRIEF DESCRIPTION OF THE DRAWINGS

FIG. 1 is a perspective view of a saw tooth incorporating the invention;

FIG. 2 is a side plan view of the saw tooth of FIG. 1;

FIG. 3 is a plan view of the attack face of the saw tooth of FIG. 1;

FIG. 4 is a sectional view of the tooth taken along the plane of the line 4—4 of FIG. 3;

FIG. 5 is a perspective view of a second embodiment of a saw tooth incorporating the invention;

FIG. 6 is a fragmentary cross-sectional view of the saw tooth of FIG. 5 as viewed from the plane of the line 6—6 of FIG. 5;

FIG. 7 is a plan view of the attack face of the wear plate of FIG. 6 as viewed from line 7—7 of FIG. 6; and FIG. 8 is a side plan of the wear plate 166A of FIGS. 5–7.

DETAILED DESCRIPTION OF THE PREFERRED EMBODIMENTS

FIGS. 1–4 illustrate a saw tooth 10 of the invention which includes a body 12 and four wear plates 14A–D. The body 12 is of conventional and known configuration. The body 12 is typically made of steel and has a head portion 16 and a shank portion 18 which in the case of the body 12 is integral with the head 16. A blind bore 20 extends axially through the body 12 and the shank end of the bore 20 is threaded at 22 so as to be engaged by an axial bolt to secure the tooth 10 on the periphery of a circular saw blade disc with one of its four cutting edges radially outermost from the rotary axis of the saw blade. The radially innermost side of the tooth typically abuts a surface of the blade to prevent the tooth from rotating during a cutting operation. Mounting four-sided rotatable saw teeth in this manner is well known and forms no part of the present invention.

The head 16 has four lateral sides 24, each of which is flat. The head 16 itself is pyramidal, tapering in the direction toward the shank 18. Each side 24 at its end opposite from the shank 18 is coterminous with a support surface 26 along edges 28 which generally define a shallow V. The support surface 26 of the head 16 is defined by milling flat each corner of the support surface 26 at an angle as best shown in FIG. 4. The rotary axis of the milling cutter used in this machining operation could be parallel to the surface being milled and lie in a plane defined by: (1) the longitudinal axis 27 of the tooth; and (2) a line running from the tip of the corner being milled to the tip of the diagonally opposite corner. As such, when the mill is run across the corner of the surface 26 and nears the edge of the surface 26, it cuts an undercut 30 or 31 in the support surface 26. The undercut 30 shown in FIG. 2 would be cut when milling the right corner area of surface 26 (as viewed in FIG. 2) and the undercut 31 would be cut when milling the left corner area of surface 26. These undercuts 30, 31 are a result of the milling process and perform no useful function.

After all four corner areas of the surface 26 are milled, a central square 34 of material remains in the center of the surface 26 with sides which are perpendicular to their adjacent corner areas of the surface 26. These sides are designated 36A–D in the drawings.

As stated above, the body 12 is known and is prior art. The body 12 may be identical to the bodies used in the Koehring Waterous Series 4000 Carbide Tipped Teeth, which are commercially available from the Koehring Waterous Division of Timberjack, Inc. of Woodstock, Ontario, Canada.

The saw tooth 10 differs from prior art saw teeth by the shape of its attack face 40 and cutting edges 42–45, which shapes are largely defined by the wear plates 14A–D. The attack face 40 is made up of four identical quadrants separated from one another by mutually orthogonal (imaginary) planes which bisect the cutting edges 42–45 and include the longitudinal axis 27 of the tooth. Each quadrant has one of the wear plates 14A–D positioned in it, and each of the wear plates 14A–D are identical to one another, each having a rear surface 50A–D to match the corresponding corner area of the support surface 26. Each rear surface 50A–D is brazed, soldered or otherwise suitably secured to the corresponding corner area to mount each wear plate 14A–D at its corresponding corner or quadrant of the body 12.

Each plate 14A–D has five lateral sides 52–56 as best shown in FIGS. 1 and 3. For each of the reference numbers 52–56, an alphabetic suffix has been added in the drawings to correspond to the alphabetic suffix of the corresponding wear plate 14A–D. For example, sides 52A–56A designate the sides of wear plate 14A.

Opposite from each rear surface 50A–D, each wear plate 14A–D has a corresponding attack face 60 A–D. The four attack faces 60A–D and the exposed surface of square 34 define the attack face 40 of the tooth 10.

The following description applies to any one of the plates 14A–D, therefore the A–D suffix is not applied to reference numerals 14, 50, 52, 53, 54, 55, 56, 60, 64, 66, 68, etc. in this description, unless necessary to distinguish one plate 14A–D from another.

Each attack face 60 is defined by a curved surface 64 and a flat plateau surface 66. Each curved surface 64 is defined by a section of a cylinder of constant radius which has its axis parallel to rear surface 50 and in a plane which is: (1) perpendicular to the rear surface 50; and (2) through the outer points on the surface 64 where the surface 64 meets its adjacent surfaces 64 (in other words, through the midpoints of the edges 42–45 of the tooth which define the corner; for example in the case of plate 14A, these points have been labelled x and y in FIG. 3, point x bisecting edge 42 and point y bisecting edge 45). The axis of this cylinder is therefore perpendicular to a plane which includes the longitudinal axis 27 of the tooth and extends through the adjacent plateau 66 and corner tip of the tooth. In the preferred embodiment, the radius of this cylindrical section is approximately 2 inches for a tooth which is approximately 1⅞" tip to tip along a side. The surface 64 is flat and parallel to rear surface 50 in its area from a line through these points (x and y in the case of plate 14A) to the edge where surface 64 intersects surface 54. When the plates 14 are mounted on body 12, each surface 64 is substantially flush with the square 34 at this edge.

The curved portion of surface 64 of each plate 14 extends up to adjoining edge 68, which extends between adjacent cutting edges of the tooth (e.g., edge 68A extends between adjacent cutting edges 42 and 45), where the surface 64 is coterminous with the plateau 66. Each plateau 66 is flat, in a plane generally perpendicular to the axis of the tooth 10, and extends from the edge 68 to cutting edges defined by the cotermination of each plateau 66 with the corresponding sides 52 and 56 of the corresponding plate 14.

The cutting edge along the side 52 of each wear plate 14 is defined by the intersection of the side surface 52 with the curved surface 64 and with the plateau 66. This cutting edge is designated 70 in the drawings. The cutting edge defined by the intersection of side surface 56 with curved surface 64 and plateau 66 is designated 72. The cutting edges 70 and 72 (and the sides 52 and 56) meet at each corner tip of the tooth with a small radius R (see "R" at the tip of plate 14A in FIG. 3), so as to truncate the sharp tip which would otherwise be formed, thereby reinforcing the tip. Thus, each plateau 66 is generally triangular, being defined by adjoining edge 68, which adjoins the concave cylindrical surface 64 and the plateau 66, and the co-planar (straight) end sections of edges 70 and 72, which end sections are joined at their inside ends by the edge 68 and at their outside ends by the radius R.

Each of the four cutting edges 42–45 of the saw tooth 10 is made up by one cutting edge 70 and one cutting edge 72 of adjacent wear plates 14. Thus, tooth edge 42 is defined by plate edges 70A and 72B, tooth edge 43 is defined by plate edges 70B and 72C, tooth edge 44 is defined by plate edges 70C and 72D, and tooth edge 45 is defined by plate edges 70D and 72A. The edges 70 and 72 which make up each tooth cutting edge 42–45 meet in approximately the middle of the corresponding side 24, where the sides 53 and 55 of adjacent plates 14 meet (for edge 42, see point x in FIG. 3; for edge 45, see point y in FIG. 3).

Thus, the attack face 40 of the tooth 10 has a complex shape, being defined by the four plateaus 66, the four curved surfaces 64 and by the exposed surfaces of the central square 34. Each of the four cutting edges of the saw tooth 10 also has a complex shape, being defined at its end sections by straight lines which lay in a plane perpendicular to the axis 27 of the tooth and form edges of the plateaus and from the straight lines toward the center of the adjacent side being defined by curved inner sections which meet in the center of the adjacent side.

The profile of each plate 14 results in increased thickness at the corner tips, in the areas of the plateau 66, and reduced thickness at the interior of each plate 14, in particular where each wear plate 14 meets the next adjacent wear plate 14. Thus, although the corners of the attack face 40 wear faster than the inner edges of the attack face 40, additional material is provided there so that the various areas of the plates 14 wear out at approximately the same time.

A saw tooth of the invention provides this advantage in a tooth which is readily manufacturable and which provides for smooth chip flow over the attack face 40. The width of each plateau 66 in the radial direction of a blade to which it is attached preferably exceeds a normal feed rate of the blade as it is advanced through a tree (for example, the plateau 66 may typically be 0.15 inches as measured along a line through axis 27 from edge 68 to the extreme tip of the plateau 66). The attack face 40, which is concave inward of the plateaus 66, is made curved in the concave area adjacent to the plateaus 66 by surfaces 64, which helps to smoothly direct the flow of chips away from the work surface of the kerf.

In addition, the increased wear plate thickness in the plateau areas and that the plateaus are all coplanar allows sharpening the cutting edges of the plateaus simultaneously on a surface grinder. Since much of the cutting of a kerf is performed by these edges, a more efficient cut can be provided over the life of the plates by sharpening these edges.

Preferably, the wear plates 14 overhang the sides 24 of the head 16 by a small distance, for example 0.015 inches, to protect the sides 24 from wear and prevent them from "washing out" at their edges 28 directly beneath the plates 14. Thus, when the wear plates 14 become worn to the point of replacement, they can be removed from the body 12 and new wear plates affixed to the body 12 so as to recondition and reuse the body 12. Also, the rear edge of each side 54 is preferably chamfered as shown in FIG. 4 so that the top edge of surface 54 is close to the adjacent surface 36 so as to smoothly direct the flow of chips over the square 34.

Teeth 10 work well for cutting trees which are being harvested for their fiber, i.e., pulpwood, where the quality of severance is less important and tooth life is more important. FIGS. 5–8 illustrate a second embodiment 110 of a saw tooth of the invention which is applied when a superior quality of severance is desired, and some reduction from the tooth life attainable by the tooth 10 is acceptable. The tooth 110 has smaller and therefore sharper corner tips, which yields a cleaner cut and less damage to the wood fibers adjacent to the kerf.

The tooth 110 is the same as the tooth 10 and provides many of the same advantages, except respecting the shape of the attack face and cutting edges as described below. In the drawings of the tooth 110, corresponding elements are labelled with the same reference number as in the tooth 10, plus 100. As in the tooth 10, the wear plates 114A–D are identical to one another, so FIGS. 6–8 illustrate only plate 114A and the suffix A–D is not used in the following description.

In the attack face of the tooth 110, two concavely curved surfaces, both defined by a section of a constant radius cylinder, define the attack face in each quadrant. Consequently, another edge or peak is defined in each quadrant at 169 which extends between cutting edges, is parallel to edge 168, and along which both curved surfaces 164 and 165 are coterminous. The radius and center of the cylindrical section of the surface 164 may be the same in the tooth 110 as in the tooth 10, i.e., 2" radius, center positioned as defined above, for a 1⅞" square tooth. The radius of the surface 165, however, is preferably only ¼ of the radius of surface 164, i.e., ½", and its axis is positioned as illustrated in FIG. 8, parallel to the axis of the cylinder that defines surface 164 and positioned ⅜ of the radius of surface 164 up from the lower edge of the plate, i.e., up ¾" from the side 154A shown in FIG. 8 in the preferred embodiment, where X is ½".

The dual cylindrical surface configuration of each plate 156 reduces the amount of carbide material at the tip of each plate 114, where the plateau 166 is located. While this reduces the life of the tooth 110, it also enables making the corner tips of the tooth 110 sharper, the plateaus 166 being smaller and spaced the same distance from the rear surface 190 of the head 116 as are the plateaus 66 in the tooth 10. In the preferred embodiment of the above dimensions, the plateau 166 may typically be 0.034 inches as measured along a line through axis 127 from edge 168 to the extreme tip of the plateau 166.

A preferred embodiment of the invention has been described in considerable detail. Many modifications and variations to the preferred embodiment will be apparent to those skilled in the art. For example, other radii could be used for the surfaces 64, 164 and 165. Therefore, the invention should not be limited to the embodiments described, but should be defined by the claims which follow.

We claim:

1. A woodcutting saw tooth of the type having four lateral sides and an attack face at one end of said tooth, the intersection of said attack face with each side forming a cutting edge, wherein the intersection of said attack face with any two adjacent sides forms a corner, the improvement wherein said attack face has four quadrants defined by imaginary mutually orthogonal planes which include an axis of said tooth and bisect the cutting edges, each of said quadrants being the same as the other quadrants, and each of said quadrants including a corner and having a plateau with a flat surface at said corner, and each of said quadrants including a first concave surface adjacent to said plateau which is defined by a section of a first cylinder, said first cylinder being of constant radius and having an axis which is perpendicular to a plane which includes said axis of said tooth and extends through said plateau, said plateau and said first concave surface being coterminous along a first adjoining edge thereof which adjoins said plateau and said first concave surface and extends between adjacent cutting edges of said tooth.

2. The improvement of claim 1, wherein adjacent cutting edges of said tooth include end sections which are adjacent edges of said plateau and first concave sections which are coterminous with said respective end sections and are edges of said first concave surface.

3. The improvement of claim 1, wherein said plateaus of said tooth are coplanar.

4. The improvement of claim 1, wherein said tooth comprises a body and wear plates secured to said body, surfaces of said wear plates defining said attack face and edges of said plates defining said cutting edges.

5. The improvement of claim 4, wherein said wear plates are thickest at said plateaus.

6. The improvement of claim 1, further comprising a second concave surface coterminous with said first concave surface along an edge which adjoins both said concave surfaces, said second concave surface being defined by a section of a second cylinder, said second cylinder being of constant radius and having an axis which is perpendicular to a plane which includes said axis of said tooth and extends through said plateau, said first and second concave surfaces being coterminous along a second adjoining edge which adjoins both of said first and second surfaces and extends between adjacent cutting edges of said tooth.

7. The improvement of claim 6, wherein said attack face forms a peak at said second adjoining edge.

8. The improvement of claim 6, wherein said radius of said second cylinder is greater than said radius of said first cylinder.

9. The improvement of claim 4, wherein said radius of said second cylinder is approximately four times said radius of said first cylinder.

* * * * *